US010678512B2

(12) United States Patent
Browning

(10) Patent No.: US 10,678,512 B2
(45) Date of Patent: Jun. 9, 2020

(54) ENABLING LOCAL DEVELOPMENT OF MICROSERVICES FOR HOSTING IN REMOTE ORCHESTRATION ENGINES

(71) Applicant: Red Hat, Inc., Raleigh, NC (US)

(72) Inventor: Benjamin M. Browning, Brevard, NC (US)

(73) Assignee: Red Hat, Inc., Raleigh, NC (US)

( * ) Notice: Subject to any disclaimer, the term of this patent is extended or adjusted under 35 U.S.C. 154(b) by 293 days.

(21) Appl. No.: 15/333,694

(22) Filed: Oct. 25, 2016

(65) Prior Publication Data

US 2018/0113680 A1    Apr. 26, 2018

(51) Int. Cl.
*G06F 8/30*    (2018.01)
*G06F 8/71*    (2018.01)
*H04L 12/46*    (2006.01)
*H04L 12/66*    (2006.01)

(52) U.S. Cl.
CPC ............. *G06F 8/30* (2013.01); *G06F 8/71* (2013.01); *H04L 12/4641* (2013.01); *H04L 12/66* (2013.01)

(58) Field of Classification Search
None
See application file for complete search history.

(56) References Cited

U.S. PATENT DOCUMENTS

| 6,263,456 B1 * | 7/2001 | Boxall | G06F 11/362 |
| | | | 709/217 |
| 2010/0299437 A1 * | 11/2010 | Moore | H04L 67/1008 |
| | | | 709/226 |
| 2012/0005659 A1 * | 1/2012 | Bonanno | G06F 11/362 |
| | | | 717/129 |
| 2013/0174126 A1 * | 7/2013 | Belihomji | G06F 11/3668 |
| | | | 717/127 |
| 2015/0135165 A1 * | 5/2015 | Simernitski | G06F 11/3664 |
| | | | 717/124 |
| 2015/0288622 A1 * | 10/2015 | Fargano | H04L 43/08 |
| | | | 370/401 |

(Continued)

OTHER PUBLICATIONS

Richardson, Chris, "Building Microservices: Using an API Gateway," NGINX, Jun. 15, 2015, 21 pages, https://www.nginx.com/blog/building-microservices-using-an-api-gateway/.

(Continued)

*Primary Examiner* — Philip J Chea
*Assistant Examiner* — Hassan A Khan
(74) *Attorney, Agent, or Firm* — Withrow & Terranova, PLLC

(57) ABSTRACT

Enabling local development of microservices for hosting in remote orchestration engines is provided. In one example, a method includes registering, using an orchestration engine executing on a remote computing device comprising a processor device, a gateway service within the orchestration engine to have a same type as a microservice under development within a local development environment executing on a local computing device. A bidirectional connection between the gateway service and the local development environment is established. The gateway service within the orchestration engine receives inbound network traffic directed to the microservice under development, and redirects the inbound network traffic to the microservice under development.

14 Claims, 4 Drawing Sheets

(56) References Cited

U.S. PATENT DOCUMENTS

2016/0127454 A1* 5/2016 Maheshwari ........... H04L 41/00
                                                    709/223
2017/0046146 A1* 2/2017 Jamjoom ................. G06F 8/62
2017/0230349 A1* 8/2017 Gaur ....................... G06F 21/00

OTHER PUBLICATIONS

Skeggs, Eli, "Generating Certificates for Local Development—Reducing developer friction and ensuring a consistent environment," Mixmax Engineering Blog, Jul. 1, 2016, 10 pages, https://mixmax.com/blog/generating-certiticates-for-local-development.

* cited by examiner

ENABLING LOCAL DEVELOPMENT OF MICROSERVICES FOR HOSTING IN REMOTE ORCHESTRATION ENGINES

TECHNICAL FIELD

The examples relate generally to development of microservices, and, in particular, to mechanisms for enabling microservices to be developed in local development environments for hosting in remote orchestration engines.

BACKGROUND

Microservices are lightweight modular processes that communicate and coordinate over a network to provide distributed software solutions that are scalable and maintainable. Microservices may be deployed within and accessed via an orchestration engine, which acts as a central controller for managing complex cross-domain processes and exception handling.

SUMMARY

The examples include enabling local development of microservices for hosting in remote orchestration engines. Enabling local development of microservices according to examples disclosed herein may be useful for providing an efficient developer workflow by allowing a microservice under development within a local development environment to interact transparently with other microservices hosted by a remote orchestration engine, and with the orchestration engine itself. As used herein, an "orchestration engine" may refer to any application or container platform for defining, hosting, and deploying microservices, and may include, as non-limiting examples, RedHat OpenShift, Docker Compose, and the like.

In one example, a method for enabling local development of a microservice for hosting in a remote orchestration environment is provided. The method includes registering, using an orchestration engine executing on a remote computing device comprising a processor device, a gateway service within the orchestration engine to have a same type as a microservice under development within a local development environment executing on a local computing device. The method further includes establishing a bidirectional connection between the gateway service and the local development environment. The method also includes receiving, by the gateway service within the orchestration engine, inbound network traffic directed to the microservice under development. The method additionally includes redirecting, by the gateway service within the orchestration engine, the inbound network traffic to the microservice under development.

In another example, a computing device is provided. The computing device includes a memory and a processor device coupled to the memory. The processor device is to register, using an orchestration engine executing on the processor device, a gateway service within the orchestration engine to have a same type as a microservice under development within a local development environment executing on a local computing device. The processor device is further to establish a bidirectional connection between the gateway service and the local development environment. The processor device is also to receive, by the gateway service within the orchestration engine, inbound network traffic directed to the microservice under development. The processor device is additionally to redirect, by the gateway service within the orchestration engine, the inbound network traffic to the microservice under development.

In another example, a computer program product for enabling local development of a microservice for hosting in a remote orchestration environment is provided. The computer program product is stored on a non-transitory computer-readable storage medium, and includes instructions to cause a processor device to register, using an orchestration engine executing on the processor device, a gateway service within the orchestration engine to have a same type as a microservice under development within a local development environment executing on a local computing device. The instructions are further to cause the processor device to establish a bidirectional connection between the gateway service and the local development environment. The instructions are also to cause the processor device to receive, by the gateway service within the orchestration engine, inbound network traffic directed to the microservice under development. The instructions are additionally to cause the processor device to redirect, by the gateway service within the orchestration engine, the inbound network traffic to the microservice under development.

Individuals will appreciate the scope of the disclosure and realize additional examples thereof after reading the following detailed description of the examples in association with the accompanying drawing figures.

BRIEF DESCRIPTION OF THE DRAWINGS

The accompanying drawing figures incorporated in and forming a part of this specification illustrate several examples of the disclosure and, together with the description, serve to explain the principles of the disclosure.

DETAILED DESCRIPTION

Figure 1:
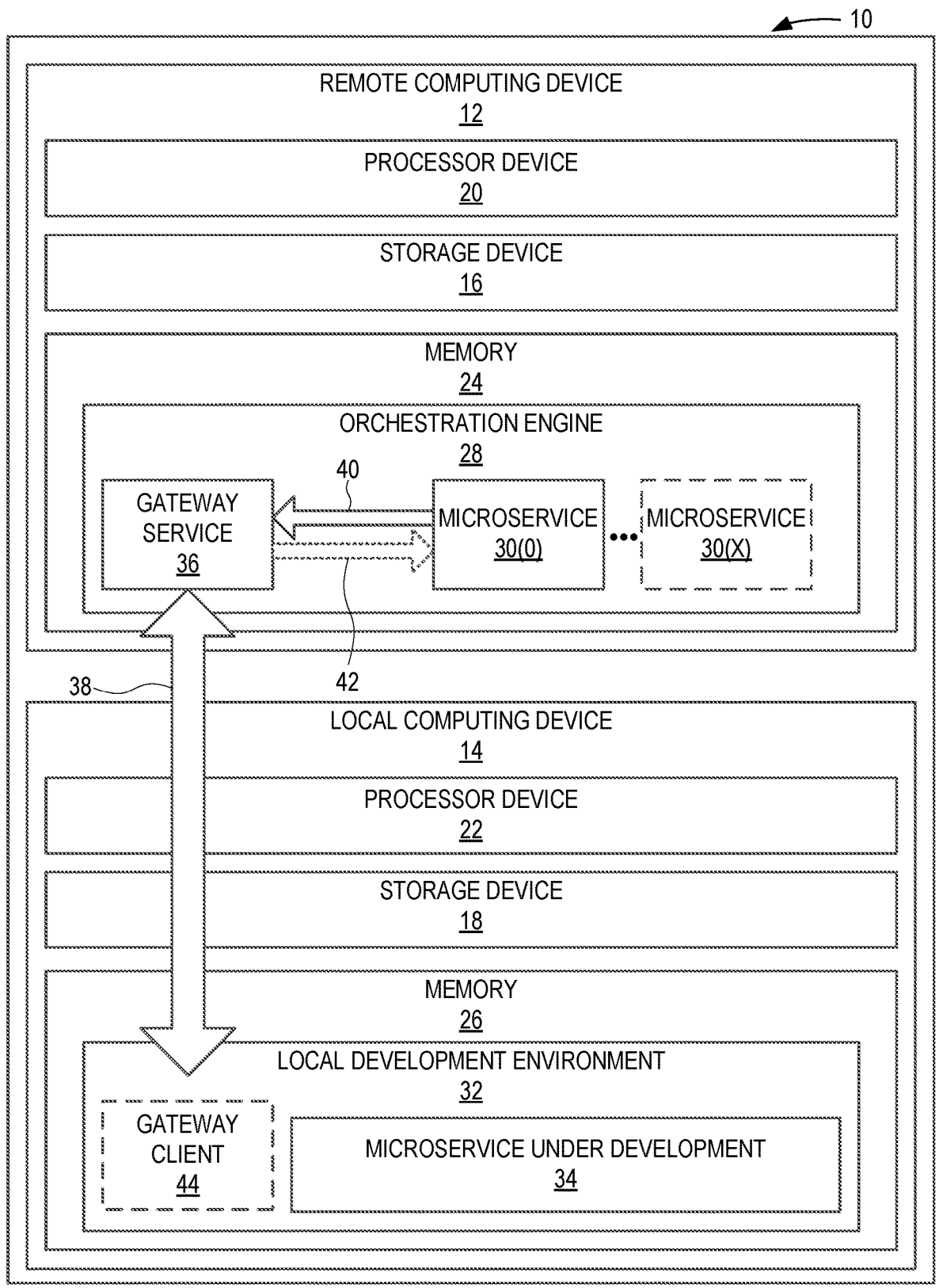
FIG. 1 is a block diagram of a system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refer to "one or more" of the element unless otherwise explicitly specified.

Microservices are lightweight modular processes that communicate and coordinate over a network to provide distributed software. Through the use of microservices, developers may distribute application functionality into separate "cloud-based" modules that run independently of one another, and that may be easier to scale and maintain than a single monolithic application. Moreover, due to their independent nature, microservices may be separately developed using different programming language, and may be executed in separate processor spaces.

Microservices may be deployed within and accessed via an orchestration engine, which acts as a central controller for managing complex cross-domain processes and exception handling. Some non-limiting examples of orchestration engines include Red Hat OpenShift and Docker Compose, among others. However, the use of an orchestration engine may pose challenges during development of a microservice. Unlike a monolithic application, which can be developed entirely within a local development environment executing on a local computing device, a microservice under development may need to interact with other existing microservices residing within the orchestration engine executing on a remote computing device. At the same time, it is desirable for the microservice under development to be accessible within a local development environment for debugging.

The examples described herein include enabling local development of microservices for hosting in remote orchestration engines. Enabling local development of microservices according to examples disclosed herein may be useful for providing an efficient developer workflow by allowing a microservice under development within a local development environment to interact transparently with other microservices hosted by a remote orchestration engine, and with the orchestration engine itself.

In this regard, FIG. 1 is a block diagram of a system 10 in which examples may be practiced. The system 10 includes a remote computing device 12 and a local computing device 14. It is to be understood that the terms "remote" and "local" are relative to a developer of a microservice, with "remote" referring to a computing device on which the microservice will be hosted and "local" referring to a computing device on which the microservice will be developed and debugged by the developer. The remote computing device 12 and the local computing device 14 may be referred to herein as the "computing device 12" and the "computing device 14," respectively.

Each of the remote computing device 12 and the local computing device 14 is attached to a corresponding storage device 16, 18, and further includes a corresponding processor device 20, 22 and a memory 24, 26. Each memory 24, 26 may comprise a random access memory (RAM) such as a dynamic RAM (DRAM), as a non-limiting example. The storage devices 16, 18 each may comprise any combination of types of storage devices, such as, by way of non-limiting example, a hard disk drive (HDD), a solid state drive (SSD), or the like, and may comprise and/or provide a computer-readable medium. The storage devices 16, 18 may store executable code containing computer-executable instructions for performing operations described herein.

Stored within the memory 24 of the remote computing device 12 is an orchestration engine 28 (also referred to herein as the "remote orchestration engine 28"). The orchestration engine 28 may include one or more applications or container platforms for defining, hosting, and deploying one or more microservices 30(0)-30(X). As non-limiting examples, the orchestration engine 28 may include products such as RedHat OpenShift, Docker Compose, and the like. In some examples, each of the microservices 30(0)-30(X) is configured to execute within its own processor space, and provides an application programming interface (API) contract that defines how the microservice 30(0)-30(X) communicates with other microservices 30(0)-30(X), with the orchestration engine 28, and/or with other consumer applications. The orchestration engine 28 provides a registry or other data structure in which the microservices 30(0)-30(X) are registered, and which is used for maintaining and administering the microservices 30(0)-30(X) and for providing a discovery mechanism through which each microservices 30(0)-30(X) may determine the availability and functionality of other microservices 30(0)-30(X). The process for registering the microservices 30(0)-30(X) is specific to different implementations of the orchestration engine 28. As non-limiting examples of the orchestration engine 28 of FIG. 1, the Docker Compose orchestration engine generates a "docker-compose.yml" that lists each microservice 30(0)-30(X) along with any required configuration data, while the Red Hat OpenShift orchestration engine provides a command-line tool or web console through which each microservice 30(0)-30(X) may be defined and configured. It is to be understood that other orchestration engines 28 may provide other mechanisms for registering the microservices 30(0)-30(X).

The local computing device 14 also includes a local development environment 32. The local development environment 32 may include one or more development tools or integrated development environments (IDEs) used by a developer for programming and debugging a microservice under development 34. When using a conventional microservice architecture to implement the microservice under development 34, the developer may have to upload the microservice under development 34 from the local computing device 14 to the orchestration engine 28 on the remote computing device 12 after each modification to the microservice under development 34. This may necessitate frequent network accesses and reconfiguration of the orchestration engine 28, resulting in a cumbersome development workflow. Moreover, the local development environment 32 may not be able to attach to processes in which the microservices 30(0)-30(X) execute on the remote computing device 12, making debugging of the microservice under development 34 difficult.

In this regard, a gateway service 36 is provided within the orchestration engine 28 to enable local development of the microservice under development 34. The gateway service 36 is registered by the orchestration engine 28 as having a same type as the microservice under development 34. As a non-limiting example, the gateway service 36 may be registered with the orchestration engine 28 as supporting the same API contract as the microservice under development 34, such that the interfaces used by the orchestration engine 28 and the microservices 30(0)-30(X) for interacting with the gateway service 36 are indistinguishable from those used to interact with the microservice under development 34. In some examples, the gateway service 36 may include a virtual private network (VPN) server or equivalent functionality. Some examples may provide that the gateway service 36 is functionally integrated into the orchestration engine 28 as an integral feature.

Once the gateway service 36 is registered by the orchestration engine 28, a bidirectional connection 38 is established between the gateway service 36 and the local development environment 32 of the local computing device 14. The bidirectional connection 38 in some examples may include a network connection between the remote computing device 12 and the local computing device 14, and may be initiated by the gateway service 36 or by the local development environment 32, depending on the specific implementation of the gateway service 36 and the particular characteristics of the local development environment 32. During implementation of the microservice under development 34, the gateway service 36 receives inbound network traffic 40 that is directed to the microservice under development 34. Some examples may provide that the inbound network traffic 40 originates from a microservice 30(0)-30(X) of the one or more microservices 30(0)-30(X) within the orchestration engine 28. The gateway service 36 is configured to redirect the inbound network traffic 40 to the microservice under development 34 via the bidirectional connection 38. According to some examples, the gateway service 36 may also receive outbound network traffic 42 that originates from the microservice under development 34 and is directed to a microservice 30(0)-30(X) of the one or more microservices 30(0)-30(X). The gateway service 36 thus redirects the outbound network traffic 42 to the corresponding microservice 30(0)-30(X) of the one or more microservices 30(0)-30(X). In this manner, the developer may efficiently implement and debug the microservice under development 34 within the local development environment 32, while transparently interacting with the microservices 30(0)-30(X) within the orchestration engine 28.

To facilitate communications between the gateway service 36 and the local development environment 32, some examples may provide a gateway client 44 within the local development environment 32. The gateway client 44 may handle communications to and from the local development environment 32 and the gateway service 36. Accordingly, in such examples, the bidirectional connection 38 may be established between the gateway service 36 and the gateway client 44. Some examples may provide that the gateway client 44 may include a VPN client or equivalent functionality.

Figure 2:
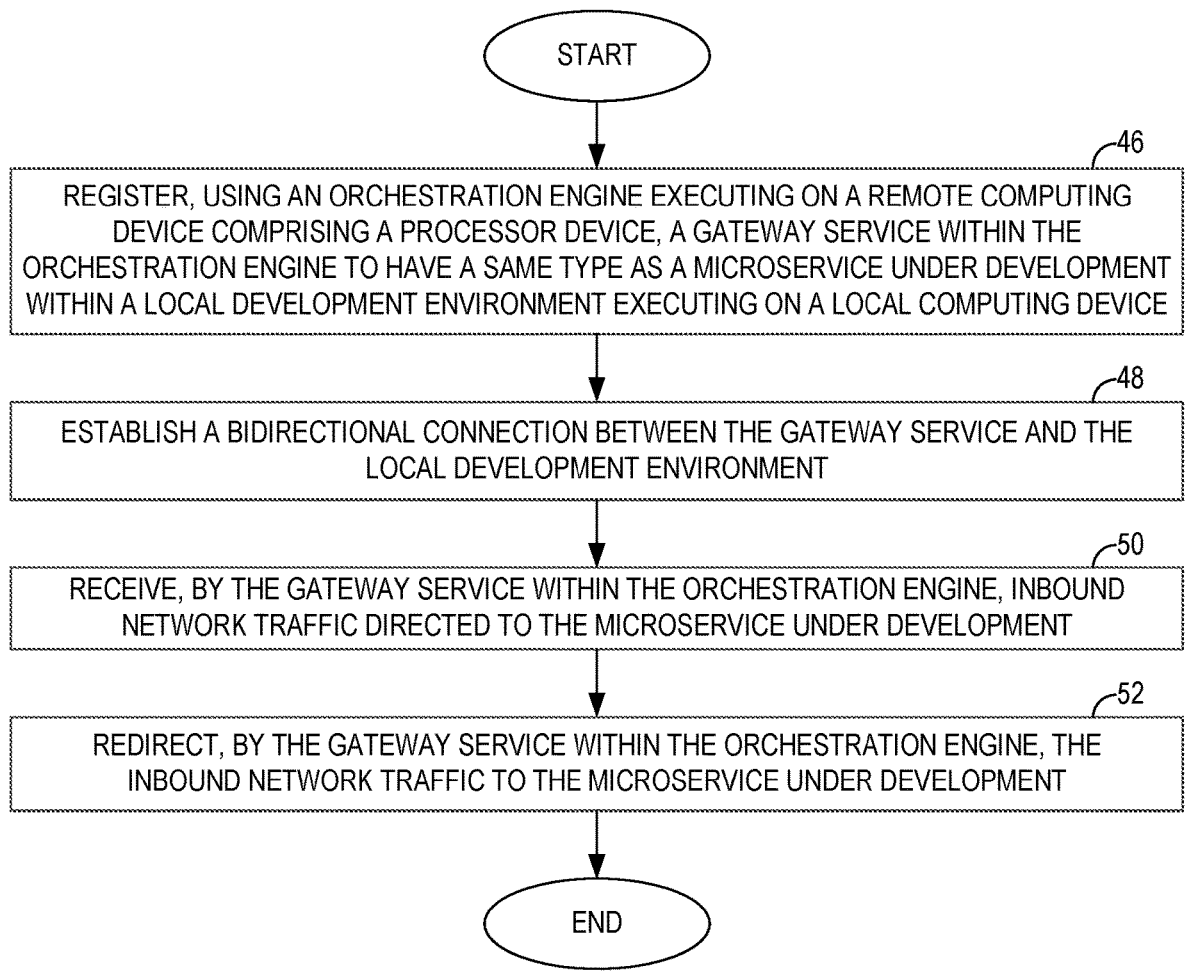
FIG. 2 is a flowchart of a method for enabling local development of microservices for hosting in remote orchestration engines by the system of FIG. 1 according to one example.

To illustrate operations for enabling local development of microservices for hosting in remote orchestration engines by the system 10 of FIG. 1 according to one example, FIG. 2 is provided. For the sake of clarity, elements of FIG. 1 are referenced in describing FIG. 2. Operations in FIG. 2 begin with the gateway service 36 being registered, using the orchestration engine 28 executing on the remote computing device 12 comprising the processor device 20, to have a same type as the microservice under development 34 within the local development environment 32 executing on the local computing device 14 (block 46). In some examples, registration of the gateway service 36 may be performed by the orchestration engine 28 according to a specific registration mechanism provided by the orchestration engine 28. The bidirectional connection 38 is next established between the gateway service 36 and the local development environment 32 (block 48). The gateway service 36 receives inbound network traffic 40 directed to the microservice under development 34 (block 50). The gateway service 36 then redirects the inbound network traffic 40 to the microservice under development 34 (block 52).

Figure 3:
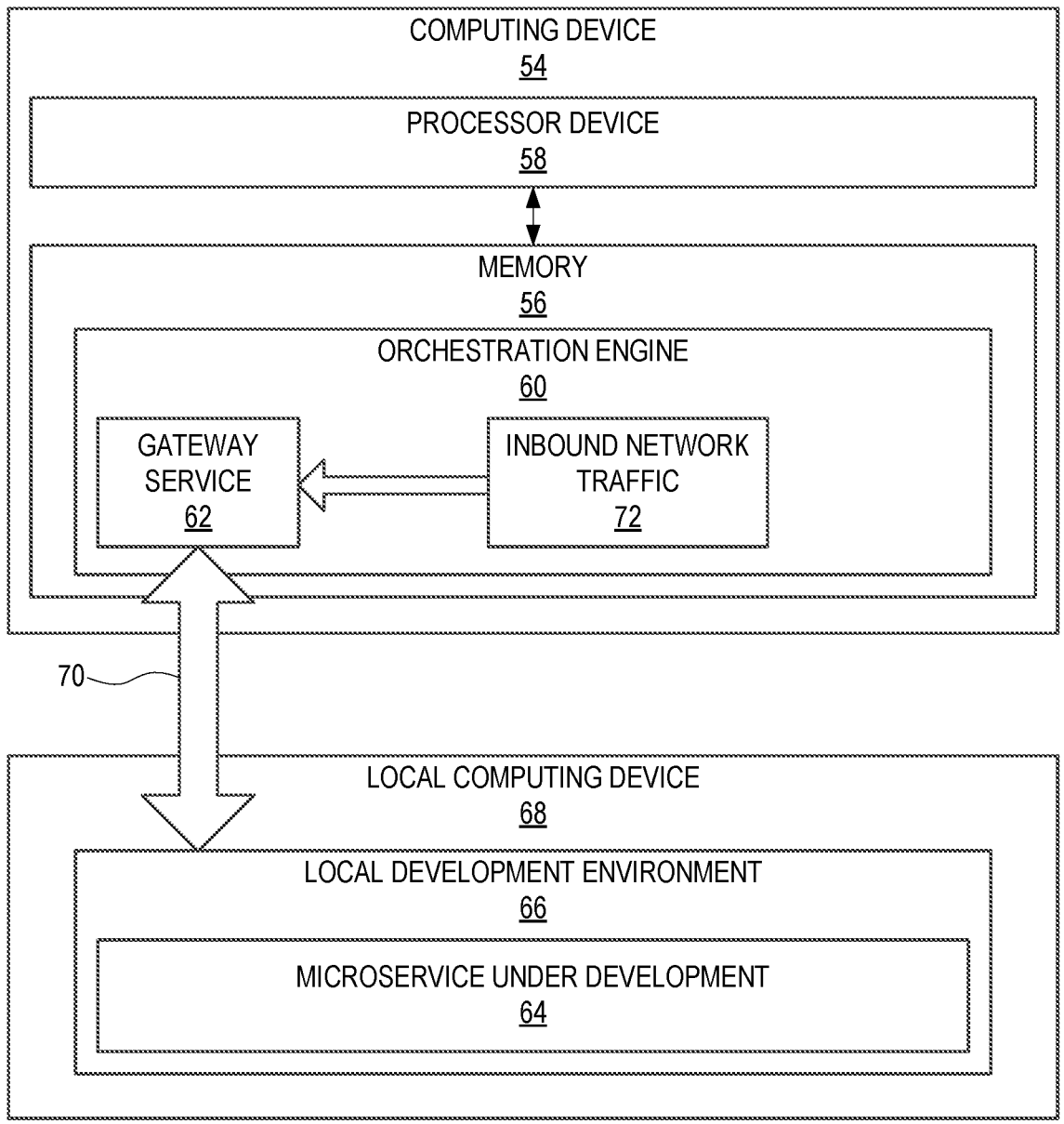
FIG. 3 is a block diagram of an apparatus for enabling local development of microservices for hosting in remote orchestration engines according to one example.

To illustrate an apparatus for enabling local development of microservices according to one example, FIG. 3 is provided. As seen in FIG. 3, a computing device 54 is provided, including a memory 56 and a processor device 58 coupled to the memory 56. The processor device 58 is to register, using an orchestration engine 60 executing on the processor device 58, a gateway service 62 within the orchestration engine 60 to have a same type as a microservice under development 64 within a local development environment 66 executing on a local computing device 68. A bidirectional connection 70 is established between the gateway service 62 and the local development environment 66. Upon receiving inbound network traffic 72 directed to the microservice under development 64, the gateway service 62 redirects the inbound network traffic 72 to the microservice under development 64.

Figure 4:
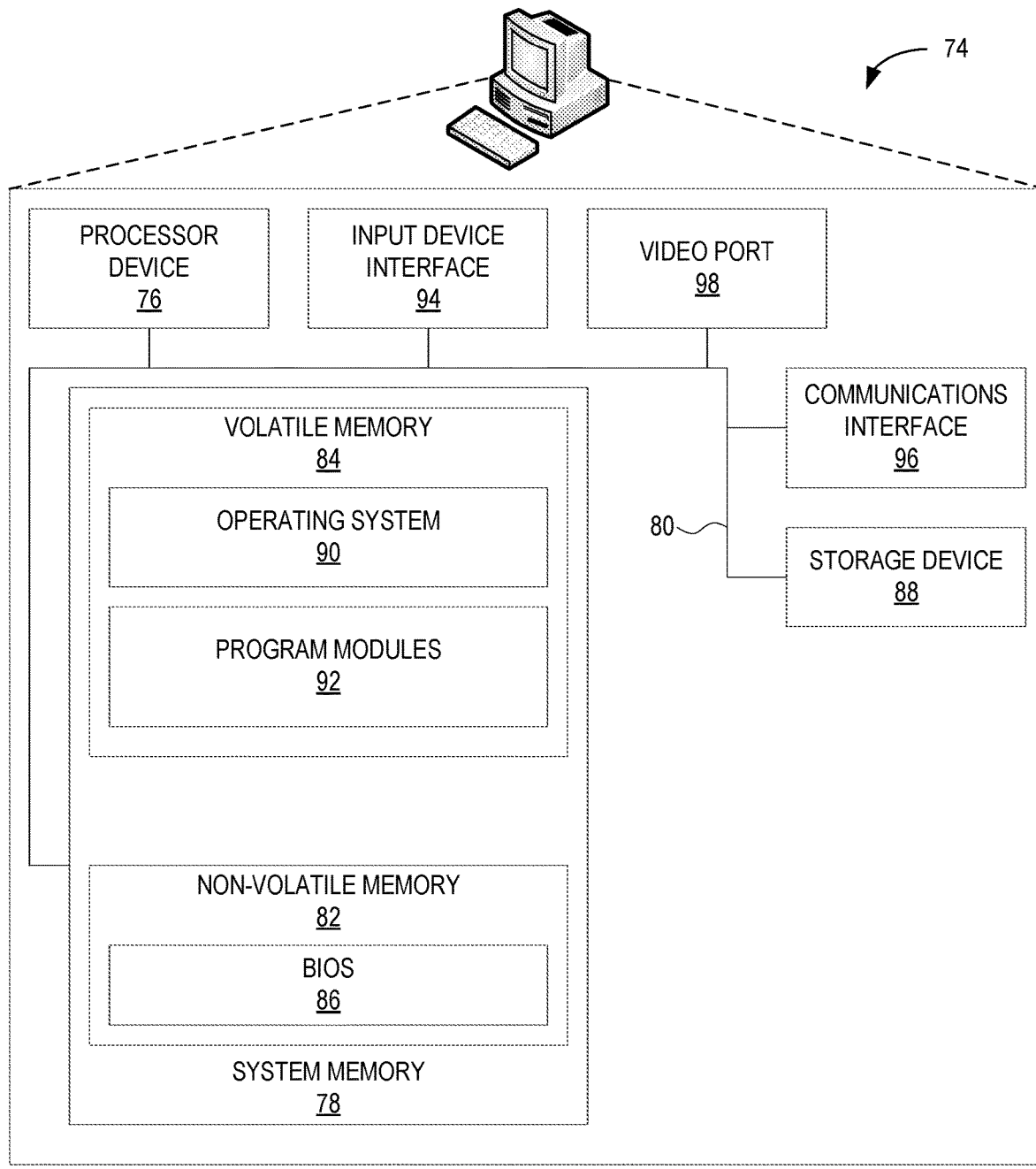
FIG. 4 is a block diagram of a computing device suitable for implementing examples according to one example.

FIG. 4 is a block diagram of a computing device 74, such as the remote computing device 12 and/or the local computing device 14 of FIG. 1, suitable for implementing examples according to one example. The computing device 74 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 74 includes a processor device 76, a system memory 78, and a system bus 80. The system bus 80 provides an interface for system components including, but not limited to, the system memory 78 and the processor device 76. The processor device 76 can be any commercially available or proprietary processor.

The system bus 80 may be any of several types of bus structures that may further interconnect to a memory bus (with or without a memory controller), a peripheral bus, and/or a local bus using any of a variety of commercially available bus architectures. The system memory 78 may include non-volatile memory 82 (e.g., read-only memory (ROM), erasable ROM (EPROM), electrically EPROM (EEPROM), etc.), and volatile memory 84 (e.g., RAM). A basic input/output system (BIOS) 86 may be stored in the non-volatile memory 82 and can include the basic routines that help to transfer information among elements within the computing device 74. The volatile memory 84 may also include a high-speed RAM, such as static RAM, for caching data.

The computing device 74 may further include or be coupled to a non-transitory computer-readable storage medium such as a storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 88 and in the volatile memory 84, including an operating system 90 and one or more program modules 92 which may implement the functionality described herein in whole or in part. It is to be appreciated that the examples can be implemented with various commercially available operating systems 90 or combinations of operating systems 90.

A number of modules can be stored in the storage device 88 and in the volatile memory 84, including, by way of non-limiting example, the gateway service 36. All or a portion of the examples may be implemented as a computer program product stored on a transitory or non-transitory computer-usable or computer-readable storage medium, such as the storage device 88, which includes complex programming instructions, such as complex computer-readable program code, to cause the processor device 76 to carry out the steps described herein. Thus, the computer-readable program code can comprise software instructions for implementing the functionality of the examples described herein when executed on the processor device 76. The processor device 76 may serve as a controller, or control system, for the computing device 74 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 76 through an input device interface 94 that is coupled to the system bus 80 but can be connected by other interfaces, such as a parallel port, an Institute of Electrical and Electronic Engineers (IEEE) 1394 serial port, a Universal Serial Bus (USB) port, an IR interface, and the like.

The computing device 74 may also include a communications interface 96 suitable for communicating with a network as appropriate or desired. The computing device 74 may also include a video port 98 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method for enabling local development of a microservice for hosting in a remote orchestration environment, comprising:
   registering, using an orchestration engine executing on a remote computing device comprising a processor device, a gateway service within the orchestration engine to have a same type as a microservice under development within a local development environment executing on a local computing device, wherein registering the gateway service to have the same type as the microservice under development comprises registering the gateway service as supporting a same application programming interface (API) contract as the microservice under development;
   establishing a bidirectional connection between the gateway service and the local development environment;
   receiving, by the gateway service within the orchestration engine, inbound network traffic directed to the microservice under development, the inbound network traffic comprising inbound network traffic originating from a microservice of one or more microservices hosted by the orchestration engine;
   redirecting, by the gateway service within the orchestration engine, the inbound network traffic to the microservice under development;
   receiving, by the gateway service within the orchestration engine, outbound network traffic originating from the microservice under development and directed to the microservice of the one or more microservices; and
   redirecting the outbound network traffic originating from the microservice under development to the microservice of the one or more microservices.

2. The method of claim 1, wherein establishing the bidirectional connection between the gateway service and the local development environment comprises establishing a bidirectional connection between the gateway service and a gateway client executing on the local computing device.

3. The method of claim 2, wherein the gateway client comprises a virtual private network (VPN) client.

4. The method of claim 1, wherein the gateway service comprises a virtual private network (VPN) server.

5. The method of claim 1, wherein the gateway service is integrated into the orchestration engine.

6. A computing device, comprising:
   a memory; and
   a processor device coupled to the memory to:
      register, using an orchestration engine executing on the processor device, a gateway service within the orchestration engine to have a same type as a microservice under development within a local development environment executing on a local computing device, wherein to register the gateway service to have the same type as the microservice under development is to register the gateway service as supporting a same application programming interface (API) contract as the microservice under development;
      establish a bidirectional connection between the gateway service and the local development environment;
      receive, by the gateway service within the orchestration engine, inbound network traffic directed to the microservice under development, the inbound network traffic comprising inbound network traffic originating from a microservice of one or more microservices hosted by the orchestration engine;
      redirect, by the gateway service within the orchestration engine, the inbound network traffic to the microservice under development;
      receive, by the gateway service within the orchestration engine, outbound network traffic originating from the microservice under development and directed to the microservice of the one or more microservices; and
      redirect the outbound network traffic originating from the microservice under development to the microservice of the one or more microservices.

7. The computing device of claim 6, wherein the processor device is further to establish a connection between the gateway service and the local development environment by establishing a connection between the gateway service and a gateway client executing on the local computing device.

8. The computing device of claim 7, wherein the gateway client comprises a virtual private network (VPN) client.

9. The computing device of claim 6, wherein the gateway service comprises a virtual private network (VPN) server.

10. The computing device of claim 6, wherein the gateway service is integrated into the orchestration engine.

11. A computer program product for enabling local development of a microservice for hosting in a remote orchestration environment, the computer program product stored on a non-transitory computer-readable storage medium and including instructions to cause a processor device to:
   register, using an orchestration engine executing on the processor device, a gateway service within the orchestration engine to have a same type as a microservice under development within a local development environment executing on a local computing device, wherein to register the gateway service to have the same type as the microservice under development is to register the gateway service as supporting a same application programming interface (API) contract as the microservice under development;

establish a bidirectional connection between the gateway service and the local development environment;

receive, by the gateway service within the orchestration engine, inbound network traffic directed to the microservice under development, the inbound network traffic comprising inbound network traffic originating from a microservice of one or more microservices hosted by the orchestration engine;

redirect, by the gateway service within the orchestration engine, the inbound network traffic to the microservice under development;

receive, by the gateway service within the orchestration engine, outbound network traffic originating from the microservice under development and directed to the microservice of the one or more microservices; and redirect the outbound network traffic originating from the microservice under development to the microservice of the one or more microservices.

12. The computer program product of claim 11, including instructions to cause the processor device further to establish a connection between the gateway service and the local development environment by establishing a connection between the gateway service and a gateway client executing on the local computing device.

13. The computer program product of claim 12, wherein the gateway client comprises a virtual private network (VPN) client.

14. The computer program product of claim 11, wherein the gateway service comprises a virtual private network (VPN) server.

* * * * *